United States Patent Office 3,819,763
Patented June 25, 1974

3,819,763
IMPACT RESISTANT RESINOUS COMPOSITIONS CONTAINING ACRYLONITRILE-CHLORINATED POLYETHYLENE-STYRENE RESIN OR METHYL METHACRYLATE-CHLORINATED POLYETHYLENE-STYRENE RESIN AND AN ELASTOMER
Junta Akane, Tokyo, Takanori Saito, Kawasaki, and Tetsuo Yasuda, Ashigara, Japan, assignors to Showa Denko Kabushiki Kaisha, Tokyo, Japan
No Drawing. Filed June 30, 1972, Ser. No. 267,982
Claims priority, application Japan, Oct. 4, 1971, 46/77,070
Int. Cl. C08f 41/12
U.S. Cl. 260—876 R                    9 Claims

ABSTRACT OF THE DISCLOSURE

A thermoplastic resinous molding composition of improved impact strength which comprises an intimate mixture of:
(a) 100 parts by weight of either an acrylonitrile-chlorinated polyethylene-styrene type resin or a methyl methacrylate-chlorinated polyethylene-styrene type resin,
(b) 2–20 parts by weight of an elastomer not having an unsaturated bond in its main chain, and optionally
(c) Up to 100 parts by weight of either a polymeric or copolymeric resin of vinyl chloride.

---

This invention relates to a thermoplastic resinous molding composition of improved impact strength which comprises a chlorinated polyethylene type resin in which has been incorporated specific components.

Heretofore, the acrylonitrile-chlorinated polyethylene-styrene type resin (ACS resin) and the methyl methacrylate-chlorinated polyethylene-styrene type resin (MCS resin) have been known as the chlorinated polyethylene type resins. The ACS resin is obtained either by graft polymerizing an acrylonitrile-styrene monomeric mixture in the presence of chlorinated polyethylene or by blending an acrylonitrile-styrene copolymer with chlorinated polyethylene. On the other hand, the MCS resin is obtained by using methyl methacrylate instead of the foregoing acrylonitrile. In this case, styrene also includes alpha-methyl styrene. These chlorinated polyethylene type resins are excellent molding resins, since they have good weatherability, resistance to attack by chemicals, processability and fireproofness as well as excel in their tensile strength. While their impact strength is also good, a still greater improvement is being desired in this respect so as to enable them to meet the demands of still harsher conditions.

It has now been found that a marked improvement in the impact strength can be had by incorporating a small amount of a certain elastomer in the foregoing chlorinated polyethylene type resins and that a still striking improvement in the impact strength can be obtained by incorporating both the foregoing elastomer and a vinyl chloride resin.

Various attempts have been made in the past of improving the impact strength of certain resins by incorporating them with an elastomeric component.

However, as an offset to the improvement in the impact strength there was inevitably a decline in the tensile strength and processability. In the case of the chlorinated polyethylene type resins, there was not only an improvement in the impact strength but also a marked improvement in the tensile strength and processability when the hereinafter mentioned elastomeric components were mixed. Further, the fact that a still striking improvement is had in the impact strength of the chlorinated polyethylene type resins when incorporated, in addition to the elastomeric component, with a hard vinyl chloride resin, which in itself is low in impact strength, was truly unexpected. Such a phenomenon is believed to be due to a special synergistic effect that is brought about among the three components contained in the chlorinated polyethylene type resins, i.e., the chlorinated polyethylene, elastomer and vinyl chloride components.

The invention will be more fully described below.

The chlorinated polyethylene type resins, as herebefore mentioned, include the ACS resin and the MCS resin and, while their composition covers a broad range, all can be suitably used in the present invention. Desirable compositions are those in which the content of the chlorinated polyethylene component is 5–40% by weight, and preferably 10–30% by weight, and in which the chlorine content of the chlorinated polyethylene component is 10–50% by weight, and preferably 20–40% by weight. In the case of the ACS resin, the content of the acrylonitrile component is 10–35% by weight, and preferably 15–20% by weight, and in the case of the MCS resin, the content of the methyl methacrylate component is 30–80% by weight, and preferably 45–65% by weight.

The elastomeric component to be incorporated is one which does not contain an unsaturated bond in its main chain. Included are, for example, the ethylene-propylene copolymer rubber (EPR or EPM), ethylene-propylene-nonconjugated diene terpolymer rubber (EPT or EPDM), ethylene-vinyl acetate copolymer (EVAc), acrylic rubber, and the like. Both EPR and EPT have an ethylene component content of 35–85% by weight and a density of 0.85–0.87 and are noncrystalline rubbery substances. EVAc is a copolymer of ethylene and vinyl acetate and contains the latter in an amount of 5–50% by weight, and preferably about 10–30% by weight. Acrylic rubber is typified by the copolymer of ethyl acrylate and 2-chloroethylvinyl ether and the copolymer of butyl acrylate and acrylonitrile, in which the content of the acrylic acid ester usually ranges from 95–65% by weight. Needless to say, a plurality of classes of these elastomers may be mixed and used as the elastomeric component.

As the vinyl chloride resin to be incorporated with the elastomeric component, useable is the commercial hard vinyl chloride resin having a degree of polymerization of 400–2000, and preferably 700–1500. Useable are not only the homopolymers of vinyl chloride but also such resins as the copolymers, for example, the predominantly vinyl chloride copolymers with ethylene or propylene, the copolymers with either vinyl acetate or vinylidene chloride, or the post-chlorinated products of these copolymers, and like.

A striking improvement in the impact strength of the chlorinated polyethylene type resins can be achieved by intimately mixing the foregoing elastomer or the elastomer and the vinyl chloride resin in the chlorinated polyethylene type resin. The amount of the elastomer and the vinyl chloride resin to be mixed must be chosen so as to be in a range that will not greatly impair the good properties possessed by the base chlorinated polyethylene type resin itself, e.g., its processability, tensile strength, thermal stability, etc. For achieving this end, the amount incorporated of the elastomeric component should be 2–20 parts by weight, and preferably 5–10 parts by weight per 100 parts by weight of the base chlorinated polyethylene type resin, while the amount incorporated of the vinyl chloride resin should be an amount up to 100 parts by weight, preferably 0.5–30 parts by weight, still more preferably 0.5–10 parts by weight per 100 parts by weight of the base chlorinated polyethylene type resin. If the amount incorporated of the elastomeric component is less than 2 parts by weight, the intended improvement in the impact strength is not fully achieved. On the other hand, if the amount exceeds 20 parts by weight, not only is there a marked decline in the tensile strength of the resulting composition, but also a pronounced decrease takes place in the synergistic effect between the elastomer component and the chlorinated polyethylene contained in the chlorinated polyethylene type resin, with the consequence that the improvement in the impact strength is also small. In the case of the vinyl chloride resin, the desired end is achieved by the incorporation of a small amount of such as 0.5 part by weight, and with the incorporation of this component in an amount in the range of 0.5–30 parts by weight, and especially 0.5–10 parts by weight, a striking improvement of the impact strength is demonstrated as result of the synergistic effect among the three components, i.e., the chlorinated polyethylene, elastomeric component and the vinyl chloride component. An amount up to 100 parts by weight of the vinyl chloride component is permitted, but when this amount is exceeded, the thermal stability at elevated temperatures suffers, and a composition that is desirable for practical purposes cannot be obtained. As a most desirable standard for determining the amounts of these components to be incorporated, the following standards can be given: i.e., the use of the elastomeric component in an amount within the foregoing weight range and moreover in the range of 0.1–0.6 part by weight per one part by weight of the chlorinated polyethylene component contained in the base chlorinated polyethylene type resin, and the use of the vinyl chloride component in an amount within the foregoing range and moreover in the range of 0.05–1.0 part per one part by weight of the chlorinated polyethylene component contained in the base chlorinated polyethylene type resin.

The method used in mixing the components may be any of the known methods, such as by means of rolls, Banbury mixer, extruder and the like. Further, any of the known additives and stabilizers may be added at this time.

The resinous composition according to the present invention has a greatly improved impact strength while maintaining such properties as weatherability, fireproofness, resistance to attack by chemicals, high tensile strength and good processability, properties which are inherently possessed by the chlorinated polyethylene type resins. Hence, the invention composition can be suitably used as materials for molding of electrical, automotive, marine and vehicular parts and building materials as well as shaped articles for various other purposes.

The following example and control experiments will be given for more fully illustrating the present invention and its effects. The parts in the examples are on a weight basis, and the physical properties were determined in the following manner.

Izod impact strength, notched—ASTM D256–56T
Tensile strength—ASTM D638–58T (pulling speed 5 mm./min.)
Fluidity—Flow tester (nozzle 10 mm. dia. 10 mm. L., temp. 220° C., load 100 kg./cm.²)

EXAMPLE I

To 100 parts of a powdery ACS resin (content of chlorinated polyethylene component 27%, content of acrylonitrile component 17.7% obtained by polymerizing an acrylonitrile/styrene mixture in the presence of chlorinated polyethylene (chlorine content 30%) were added 8 parts of either EPT (ethylene-propylene-norbornene copolymer) of an ethylene content of 70% and Mooney viscosity of 65 or EVAc of a vinyl acetate content of 28% and melt index (MI) of 20, and in varying amounts of 1–90 parts a hard vinyl chloride resin (PVC) of a degree of polymerization of 1100. After adding a small quantity of a stabilizer, the mixture was premixed for 5 minutes at low speed with a Henschel mixer. The mixture was then melted and kneaded, using an extruder of 40-mm. diameter at a temperature of 180° C. and 40 r.p.m., after which the mixture was pelleted. Izod test pieces and tensile test pieces in the forms of respectively a square pollar ½ inch x ½ inch x 5 inch and an ASTM No. 1 dumbell were molded with a 5-ounce screw in-line type injection molder, and then the so obtained test pieces were left to stand for 24 hours at 20° C. These test pieces were then used in the tests for determining the psyical properties. The results obtained are shown in Table 1.

As controls, the results obtained when the base ACS resin was used alone (Control sample No. 1) and when only PVC was incorporated in the ACS resin (Control samples Nos. 2–7) are also shown in the table.

The elastomeric component is indicated as component (b) and the vinyl chloride component is indicated as component (c).

From the results shown in Table 1, the synergistic effect of the two components (b) and (c) in improving the impact strength of the ACS resin is apparent and it can be seen that a composition in which the strength and processability are comparable or superior, to those of the base ACS resin is obtained.

TABLE 1

| | Component (b) and amount incorporated (part) | | Component (c) and amount incorporated (part) | Physical properties | | |
|---|---|---|---|---|---|---|
| | EPT | EVAc | PVC | Impact strength* (ft.-lb-/in.-) (20° C.) | Tensile strength (kg./cm.²) | Fluidity (cc./sec. ×10²) |
| Sample number: | | | | | | |
| 1 | 8 | | 1 | 3.42# | 347 | 4.7 |
| 2 | 8 | | 3 | 5.93# | 358 | 4.6 |
| 3 | 8 | | 5 | 7.07# | 369 | 4.6 |
| 4 | 8 | | 10 | 10.13# | 386 | 4.3 |
| 5 | 8 | | 25 | 12.51# | 415 | 3.4 |
| 6 | 8 | | 90 | 10.72# | 452 | 1.2 |
| 7 | | 8 | 1 | 3.23# | 351 | 5.0 |
| 8 | | 8 | 3 | 5.52# | 363 | 4.9 |
| 9 | | 8 | 5 | 6.83# | 378 | 4.7 |
| 10 | | 8 | 10 | 9.40# | 394 | 4.6 |
| 11 | | 8 | 25 | 10.16# | 422 | 3.6 |
| 12 | | 8 | 90 | 8.98# | 460 | 1.2 |
| Control sample No.: | | | | | | |
| 1 | | | | 1.30 | 376 | 4.6 |
| 2 | | | 1 | 1.51 | 378 | 4.6 |
| 3 | | | 3 | 1.87 | 381 | 4.5 |
| 4 | | | 5 | 2.21 | 383 | 4.4 |
| 5 | | | 10 | 2.52 | 391 | 4.1 |
| 6 | | | 25 | 3.14 | 430 | 3.1 |
| 7 | | | 90 | 3.24 | 462 | 1.0 |

*The symbol # denotes that in the case of the samples appended with this symbol, severance of the sample did not take place. Hence, the true impact strength is greater than the value indicated.

EXAMPLE II

The influence of the change in the amount incorporated of the elastomeric component (b) was investigated principally. That is, to 100 parts of the ACS resin identical to that used in Example I were added in varying amounts, as indicated in Table 2, the same EPT and PVC as used in Example I, the experiment being carried out otherwise as in Example I. The results obtained are shown in Table 2.

As controls, also shown are the results obtained in those instances where the amount of the elastomeric component was not within the scope of the present invention, i.e., one part (insufficient) and 30 parts (excessive). When the elastomeric component incorporated is less than 2 parts, the effect of improving the impact strength is small. On the other hand, when the amount exceeds 20 parts, this is also unsuitable, since the decline in the tensile strength becomes pronounced though an improvement is had in the impact strength.

TABLE 2

| | Component | | Physical properties | | |
|---|---|---|---|---|---|
| | (b), EPT (part) | (c), PVC (part) | Impact strength (ft.-lb./in.) (20° C.) | Tensile strength (kg./cm.²) | Fluidity (cc./sec. ×10²) |
| Sample number: | | | | | |
| 13 | 3 | 3 | 4.63 # | 375 | 4.6 |
| 14 | 5 | 3 | 5.11 # | 366 | 4.6 |
| 2[1] | 8 | 3 | 5.93 # | 358 | 4.6 |
| 15 | 13 | 5 | 7.88 # | 342 | 4.5 |
| 16 | 20 | 5 | 9.24 # | 317 | 4.5 |
| Control sample No.: | | | | | |
| 8 | 1 | 3 | 1.96 | 369 | 4.5 |
| 9 | 30 | 7 | 10.67 # | 221 | 4.3 |

[1] As previously used.

EXAMPLE III

To 100 parts of a powdery MCS resin (content of chlorinated polyethylene component 27% and content of methyl methacrylate component 51.1%) obtained by polymerizing a methyl methacrylate/styrene mixture in the presence of chlorinated polyethylene (chlorine content 35%) was added 5 parts of EPT identical to that used in Example I, the experiment being carried out otherwise as in Example I (Sample No. 17). An experiment was also carried out in like manner except that along with the 5 parts of EPT was added 3 parts of the same PVC as used in Example I (Sample No. 18). The results obtained in the foregoing experiments are shown in Table 3 along with the results of the case where the base MCS resin was used alone (Control sample No. 10).

TABLE 3

| | Component | | Physical properties | | | |
|---|---|---|---|---|---|---|
| | (b), part | (c), part | Impact strength (ft.-lb./in.) 20° C. | −30° C. | Tensile strength (kg./cm.²) | Fluidity (cc./sec. ×10²) |
| Sample No.: | | | | | | |
| 17 | 5 | | 2.08 | 0.80 | 361 | 2.1 |
| 18 | 5 | 3 | 4.14# | 1.11 | 409 | 1.6 |
| Control sample No.: 10 | | | 1.17 | 0.36 | 412 | 1.6 | acrylonitrile/styrene copolymer (content of acrylonitrile component 23% and having an intrinsic viscosity in chloroform at 30° C. of 0.78) was admixed 5 parts of the same EPT as used in Example I, and the measurements of the physical properties were made after operating as in Example I (Sample No. 19). An experiment was also carried out in like manner except that along with the 5 parts of EPT was added 3 parts of the same PVC as used in Example I (Sample No. 20). The results obtained in the foregoing experiments are shown in Table 4 along with the results of the case where the ACS resin was used alone (Control sample No. 11).

TABLE 4

| | Component | | Physical properties | | | |
|---|---|---|---|---|---|---|
| | (b), EPT (part) | (c), PVC (part) | Impact strength (ft.-lb./in.) 20° C. | −30° C. | Tensile strength (kg./cm.²) | Fluidity (cc./sec. ×10²) |
| Sample No.: | | | | | | |
| 19 | 5 | | 1.94 | 0.91 | 352 | 6.4 |
| 20 | 5 | 3 | 4.78 | 1.23 | 391 | 5.9 |
| Control sample No.: 11 | | | 0.74 | 0.23 | 390 | 5.8 |

EXAMPLE V

Various classes of elastomeric components were used as the component (b) in carrying out this experiment. That is, to 100 parts of the same ACS resin as used in Example I was added eight parts of one of the following elastomeric components, followed by operating as in Example I and then measuring the physical properties of the test pieces (Samples Nos. 21–27). An experiment was also carried out in like manner except that along with the 8 parts of the elastomeric component was added 3 parts of the same PVC as used in Example I (Samples Nos. 28–32).

(i) EPT (ethylene content 70%, Mooney viscosity 65) as used in Example I.
(ii) EPT (ethylene content 50%, Mooney viscosity 55).
(iii) EPR (ethylene content 50%, Mooney viscosity 55).
(iv) EVAc (vinyl acetate content 28%, MI 20) as used in Example I.
(v) EVAc (vinyl acetate content 14%, MI 20).
(vi) EVAc (vinyl acetate content 36%, MI 20).
(vii) Butyl acrylate-acrylonitrile copolymer [acrylonitrile 10%, [η] (30° C., acetone) 0.3, Mooney viscosity (ML-4, 100° C.) 45].

TABLE 5

| | Component | | Physical properties | | | |
|---|---|---|---|---|---|---|
| | (b) (8 parts of each) | (c), PVC (parts) | Impact strength (ft.-lb./in.) 20° C. | −30° C. | Tensile strength (kg./cm.²) | Fluidity (cc./sec. ×10²) |
| Sample No.: | | | | | | |
| 21 | EPT (i) | | 2.84 | 1.35 | 335 | 4.8 |
| 22 | EPT (ii) | | 2.98 | 1.43 | 328 | 5.3 |
| 23 | EPR (iii) | | 2.95 | 1.39 | 330 | 5.2 |
| 24 | EVAc (iv) | | 2.39 | 1.08 | 345 | 5.1 |
| 25 | EVAc (v) | | 2.16 | 0.97 | 356 | 5.0 |
| 26 | EVAc (vi) | | 2.53 | 1.16 | 341 | 5.0 |
| 27 | Acrylic rubber (vii) | | 2.72 | 1.24 | 348 | 5.5 |
| 2[1] | EPT (i) | 3 | 5.93# | 1.56 | 358 | 4.9 |
| 28 | EPT (ii) | 3 | 6.42# | 1.62 | 341 | 5.2 |
| 29 | EPR (iii) | 3 | 6.33# | 1.60 | 345 | 5.1 |
| 8[1] | EVAc (iv) | 3 | 5.52# | 1.31 | 363 | 4.9 |
| 30 | EVAc (v) | 3 | 4.85# | 1.34 | 372 | 4.9 |
| 31 | EVAc (vi) | 3 | 5.86# | 1.48 | 360 | 4.8 |
| 32 | Acrylic rubber (vii) | 3 | 5.72# | 1.52 | 365 | 5.3 |

[1] As used previously.

EXAMPLE IV

To 100 parts of an ACS resin obtained by blending 27 parts of commercially available chlorinated polyethylene of 30.3% chlorine content with 73 parts of an

EXAMPLE VI

Various vinyl chloride resins were used as the component (c) in carrying out the experiment. That is, to 100 parts of the same ACS resin as used in Example I were added as the component (b) 8 parts of the same EPT as used in Example I and as the component (c) 3 parts of one of the vinyl chloride resins indicated in Table 6, after which the experiment was operated otherwise as in Example I followed by measurement of the physical properties of the test pieces obtained. The results obtained are shown in Table 6.

resins were mixed, either EPT of ethylene content of 70% and Mooney viscosity of 65 or EVAc of vinyl acetate content of 28% and melt index of 20 in amounts ranging from 8-20 parts, as indicated in Table 8. The total content of rubbery components, i.e., the sum total of chlorinated polyethylene contained in the ACS resin and EPT or EVAc, is a uniform value of 27%. The

TABLE 6

| | Class of component (c) (degree of polymerization) | Physical properties | | |
|---|---|---|---|---|
| | | Impact strength (ft.-lb./in.) (20° C.) | Tensile strength (kg./cm.) | Fluidity (cc./sec. ×10$^2$) |
| Sample No.: | | | | |
| 2[1] | Vinyl chloride homopolymer | (1,100) 5.93# | 358 | 4.6 |
| 33 | do | (700) 5.41# | 361 | 4.7 |
| 34 | Vinyl chloride/ethylene copolymer | (800) 4.93# | 357 | 4.9 |
| 35 | Vinyl chloride/propylene copolymer | (800) 5.17# | 346 | 4.9 |
| 36 | Vinyl chloride/vinyl acetate copolymer | (800) 5.22# | 345 | 5.0 |
| 37 | Post-chlorinated PVC | (800) 3.91# | 391 | 4.4 |

[1] As previously used.

EXAMPLE VII

To 100 parts of an MCS resin obtained by blending 27 parts of chlorinated polyethylene of a chlorine content of 30.3% with 73 parts of a methyl methacrylate/styrene copolymer having a methyl methacrylate content of 70% and an intrinsic viscosity in chloroform at 30° C. of 0.52 was added 5 parts of the same EPT as used in Example I, after which the mixture was kneaded in an extruder and pelleted. The physical properties of samples obtained from this composition were measured. Measurements of the physical properties were likewise carried out on samples obtained in like manner from a composition in which was also incorporated along with the 5 parts of the EPT 3 parts of the same PVC as used in Example I. The results of the foregoing experiments are shown in Table 7 along with the results obtained in the case of a control experiment in which the base MCS resin was used alone.

TABLE 7

| | Component | | Physical properties | | | |
|---|---|---|---|---|---|---|
| | (b), EPT (part) | (c), PVC (part) | Impact strength (ft.-lb./in.) | | Tensile strength (kg./cm.$^2$) | Fluidity (cc./sec. ×10$^2$) |
| | | | 20° C. | −30° C. | | |
| Sample number: | | | | | | |
| 33 | 5 | | 1.61 | 0.56 | 348 | 2.2 |
| 34 | 5 | 3 | 3.98# | 1.02 | 416 | 1.7 |
| Control sample No.: 12 | | | 0.79 | 0.24 | 406 | 1.7 |

EXAMPLE VIII

Several classes of powdery ACS resins of varying contents of the chlorinated polyethylene component ranging from 27% to 12.4%, as shown in Table 8, were prepared by graft polymerizing an acrylonitrile/styrene monomeric mixture (weight ratio of 23/77) in the presence of chlorinated polyethylene of 30% chlorine content. To 100 parts of the so prepared several ACS resins were mixed, either EPT of ethylene content of 70% and Mooney viscosity of 65 or EVAc of vinyl acetate content of 28% and melt index of 20 in amounts ranging from 8-20 parts, as indicated in Table 8. The total content of rubbery components, i.e., the sum total of chlorinated polyethylene contained in the ACS resin and EPT or EVAc, is a uniform value of 27%. The experiment was carried out as in Example I to prepare the samples for making the physical measurements (Samples Nos. 35–42), following which measurement of the properties were made.

As controls, ACS resins in which the chlorinated polyethylene contents were 8.75% and 5.1% were prepared in like manner. To 100 parts of such a resin was mixed the same EPT or EVAc as used hereinabove in amounts of either 25 or 30 parts, as indicated in Table 8. In all of these mixtures (Control samples Nos. 14, 15, 17 and 18) the sum total amount of the chlorinated polyethylene component and the EPT or EVAc is a uniform value of 27%.

As further controls, physical property measurements were also made on samples obtained by using alone an ACS resin having a content of the chlorinated polyethylene component of 27% (Control sample No. 13); and samples of compositions obtained by admixing 37 parts of either the foregoing EPT or EVAc with 100 parts of a copolymer obtained by polymerizing only acrylonitrile and styrene in the absence of chlorinated polyethylene and adjusting the content of the rubbery component to 27% (Control samples Nos. 16 and 19).

These results are shown together in Table 8. As is apparent from these results, the resinous compositions obtained by incorporating 2–20 parts of an elastomeric component in 100 parts of an ACS resin containing 10–30% of chlorinated polyethylene in accordance with the present invention demonstrate improved impact strength, especially impact strength at low temperatures, as well as improved tensile strength and fluidity. On the other hand, these excellent physical properties are not demonstrated in the case where the base ACS resin used is one in which the content of the chlorinated polyethylene component is outside the range of 10–30% and the amount admixed of the elastomeric component is outside the range of 2–20 parts, even though the total content of the rubbery components in the composition is the same.

TABLE 8

| | Content of chlorinated polyethylene in ACS (percent) | Component (b) | | Impact strength (ft.-lb./in.) | | Tensile strength (kg./cm.$^2$) | Fluidity (cc./sec. ×10$^2$) |
|---|---|---|---|---|---|---|---|
| | | EPT (part) | EVAc (part) | 20° C. | −30° C. | | |
| Control sample No.: 13 | 27 | | | 1.30 | 0.41 | 376 | 4.6 |
| Sample number: | | | | | | | |
| 35 | 23.35 | 5 | | 2.10 | 0.88 | 386 | 4.8 |
| 36 | 19.7 | 10 | | 2.32 | 0.96 | 391 | 5.0 |
| 37 | 16.05 | 15 | | 1.85 | 1.28 | 382 | 5.1 |
| 38 | 12.4 | 20 | | 1.68 | 1.13 | 378 | 5.3 |
| Control sample No.: | | | | | | | |
| 14 | 8.75 | 25 | | 1.32 | 0.81 | 361 | 5.4 |
| 15 | 5.1 | 30 | | 1.07 | 0.64 | 340 | 5.6 |
| 16 | 0 | 37 | | 0.67 | 0.27 | 314 | 5.7 |

TABLE 8—Continued

| Sample No.: | Content of chlorinated polyethylene in ACS (percent) | Component (b) EPT (part) | Component (b) EVAc (part) | Impact strength (ft.-lb./in.) 20° C. | Impact strength (ft.-lb./in.) −30° C. | Tensile strength (kg./cm.²) | Fluidity (cc./sec. ×10²) |
|---|---|---|---|---|---|---|---|
| 39 | 23.35 | | 5 | 1.92 | 0.73 | 392 | 4.9 |
| 40 | 19.7 | | 10 | 2.14 | 0.85 | 398 | 5.1 |
| 41 | 16.05 | | 15 | 1.72 | 0.70 | 384 | 5.3 |
| 42 | 12.04 | | 20 | 1.61 | 0.55 | 379 | 5.5 |
| Control sample No.: | | | | | | | |
| 17 | 8.75 | | 25 | 1.28 | 0.47 | 375 | 5.7 |
| 18 | 5.1 | | 30 | 1.00 | 0.34 | 366 | 5.9 |
| 19 | 0 | | 37 | 0.51 | 0.22 | 332 | 6.1 |

We claim:
1. An impact resistant resinous composition comprising:
   (a) 100 parts by weight of a chlorinated polyethylene type thermoplastic resin selected from the group consisting of
      (i) an acrylonitrile-chlorinated polyethylene-styrene resin obtained by
         (1) graft polymerizing an acrylonitrile-styrene monomeric mixture in the presence of chlorinated polyethylene, or
         (2) blending an acrylonitrile-styrene copolymer with chlorinated polyethylene, and
      (ii) a methyl methacrylate-chlorinated polyethylene-styrene resin obtained by
         (1) graft polymerizing a methyl methacrylate-styrene monomeric mixture in the presence of chlorinated polyethylene, or
         (2) blending a methyl methacrylate-styrene copolymer with chlorinated polyethylene,
      said chlorinated polyethylene type resin containing 10–30% by weight of a chlorinated polyethylene having a chlorine content of from 10–50% by weight;
   (b) 2–20 parts by weight of an elastomeric component selected from the group consisting of ethylene-propylene rubber, ethylene-propylene nonconjugated diene rubber, ethylene-vinyl acetate rubber and acrylic rubber copolymer containing 65–95% acrylic acid ester; and
   (c) 0–100 parts by weight of a polyvinyl chloride resin selected from the group consisting of polyvinyl chloride and a vinyl chloride copolymer.

2. A resinous composition according to claim 1 wherein the content of the acrylonitrile component in the acrylonitrile-chlorinated polyethylene-styrene resin is 15–20% by weight.

3. A resinous composition according to claim 1 wherein the content of the methyl methacrylate component in the methyl methacrylate-chlorinated polyethylene-styrene resin is 45–65% by weight.

4. A resinous composition according to claim 1 wherein said polyvinyl chloride resin is contained in an amount of 0.5–30 parts by weight.

5. A resinous composition according to claim 1 wherein said polyvinyl chloride resin is contained in an amount of 0.5–10 parts by weight.

6. A resinous composition according to Claim 1 wherein said elastomeric component is selected from the group consisting of an ethylene-propylene copolymeric rubber and an ethylene-propylene nonconjugated diene terepolymeric rubber, said copolymeric and terpolymeric rubbers having an ethylene content of 35–85% by weight and a density of 0.85–0.87.

7. A resinous composition according to Claim 1 wherein said elastomeric component is an ethylene-vinyl acetate copolymeric rubber having a vinyl acetate content of 5–50% by weight.

8. A resinous composition according to Claim 1 wherein said elastomeric component is selected from the group consisting of ethyl acrylate-2-chloroethylvinyl ether copolymeric rubber and butyl acrylate-acrylonitrile copolymeric rubber, said copolymeric rubbers having an acrylic acid ester content of 65–95% by weight.

9. A resinous composition according to Claim 6 wherein said elastomeric components are mixtures of ethylene-propylene copolymeric rubber and ethylene-propylene nonconjugated diene terpolymeric rubber.

References Cited
UNITED STATES PATENTS 3,673,279  6/1972  Takahashi et al. __ 260—876 R
3,496,251  2/1970  Takahashi et al. ____ 260—876
3,644,579  2/1972  Nakajima _____ 260—876

MURRAY TILLMAN, Primary Examiner
C. J. SECCURO, Assistant Examiner

U.S. Cl. X.R.
260—897 C

UNITED STATES PATENT AND TRADEMARK OFFICE
CERTIFICATE OF CORRECTION

PATENT NO. : 3,819,763
DATED : June 25, 1974
INVENTOR(S) : JUNTA AKANE, ET AL.

It is certified that error appears in the above-identified patent and that said Letters Patent are hereby corrected as shown below:

Claim 8, line 33, delete "ethyl acrylate-2-chloroethylvinyl ether" and insert--ethyl acylate/2-chloroethylvinyl ether--

Signed and Sealed this

Twenty-third Day of January 1979

[SEAL]

Attest:

RUTH C. MASON
Attesting Officer

DONALD W. BANNER
Commissioner of Patents and Trademarks